US007363008B2

(12) United States Patent
Hassan et al.

(10) Patent No.: US 7,363,008 B2
(45) Date of Patent: Apr. 22, 2008

(54) SPECTRUM SHARING IN THE UNLICENSED BAND

(75) Inventors: Amer Hassan, Kirkland, WA (US); Paramvir Bahl, Sammamish, WA (US); Jean Pierre de Vries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 811 days.

(21) Appl. No.: 10/696,908

(22) Filed: Oct. 30, 2003

(65) Prior Publication Data

US 2005/0095986 A1    May 5, 2005

(51) Int. Cl.
*H04B 1/00* (2006.01)
*H04B 15/00* (2006.01)

(52) U.S. Cl. .................. 455/63.1; 455/522; 455/67.11; 455/67.13; 455/452.1; 455/452.2; 455/455; 455/127.1; 370/318; 370/445; 370/447; 709/225

(58) Field of Classification Search ........ 455/450–451, 455/452.1–2, 67.11–16, 509, 513, 434, 435.1–3, 455/436–437, 63.1–63.3, 127.1–5, 522, 455; 370/328–329, 331–333, 445–448; 709/223–226
See application file for complete search history.

(56) References Cited

U.S. PATENT DOCUMENTS

2002/0188723 A1*  12/2002  Choi et al. ................. 709/225

2003/0181211 A1*  9/2003  Razavilar et al. ........... 455/450

FOREIGN PATENT DOCUMENTS

| EP | 1 187 504 A2 | 9/2001 |
| EP | 1 220 499 A2 | 12/2001 |
| EP | 1 257 098 A2 | 5/2002 |

OTHER PUBLICATIONS

European Search Report from corresponding European Application No. 04023828, filed unknown.
Kandukauri, Sunil and Boyd, Stephen, "Optical Power Control in Interference-Limited Fading Wireless Channels With Outage-Probability Specifications," IEEE Transactions on Wireless Communications, vol. 1, No. 1, Jan. 2002.

* cited by examiner

*Primary Examiner*—Tuan Tran
(74) *Attorney, Agent, or Firm*—Wolf, Greenfield & Sacks, P.C.

(57) ABSTRACT

The invention provides methods for autonomous detection and adaptation with respect to an interfering signal on a frequency channel to assist a wireless device on a wireless network in choosing an appropriate frequency channel. According to embodiments, a method determines an appropriate channel by first detecting whether there is an interfering signal on a frequency channel over the wireless network, then retrieving data from the interfering signal to retrieve protocol identification information. Prior to determining whether to transmit over the frequency channel, the method calls for determining whether the identified protocol of the interfering signal is a predetermined protocol.

18 Claims, 4 Drawing Sheets

FIG. 2 "Prior Art"

SPECTRUM SHARING IN THE UNLICENSED BAND

FIELD OF THE INVENTION

This invention relates generally to radio communications and, more particularly, relates to the efficient sharing of the radio spectrum.

BACKGROUND OF THE INVENTION

The radio spectrum is a limited resource which must be shared among a large number of devices. The number of such devices has grown rapidly in the recent years as integrated circuit technology and standards body activities allow a rapid development of consumer grade wireless communications devices such as cordless phones and wireless networking products.

There are several methods used to assure a given frequency band in the radio frequency spectrum is efficiently shared. In general, when two radio frequency devices are transmitting at the same time on the same or overlapping frequency bands, the transmissions can interfere with each other. For example, if a radio receiver is attempting to receive a transmission from a wireless device, the reception can be successful if the signal level induced on the antenna of the radio receiver is sufficiently large compared to the level of impairments. The impairments can be thermally generated noise, distortion of the signal from non-ideal characteristics of the channel, or interference generated by other devices transmitting on or near the same frequency band. The impairment caused by other devices is referred to as interference.

In general, a signal can be received successfully with a given probability if the ratio of the received signal from a wireless device to all interference sources is kept at or above some acceptable level. This ratio is often referred to as the carrier to interference ratio (CIR).

To insure that an acceptable CIR is maintained, wireless protocols and standards often divide bands of the radio spectrum into several channels. To insure a high CIR, transmitting devices in relatively close proximity to a given device transmit on different channels.

Because only a finite number of channels are available in any band of the radio spectrum, when the number of transmitting devices exceeds the number channels available, channels are reused. For example, if a channel is shared by two wireless devices, some level of interference to the reception of the signals transmitted by the devices will be generated.

The level of the interference received by wireless devices on a same frequency band can be greatly reduced by channeling the band of the radio spectrum. The reduction in the interference level allows the overall system to maintain a higher CIR and a higher probability of successful reception of the desired signal.

Before the recent explosion of consumer grade wireless devices, frequency sharing was largely accomplished through tight control radio transmitting devices by regulatory agencies such as the Federal Communication Commission (FCC). This level of control works well when the transmitters are few in number and easily detected, such as is the case with radio and television transmitters. A simple example of channelization controlled by the FCC is the very high frequency (VHF) television transmission. The FCC imposed a transmission standard in which the country was divided into geographic regions. Although the spectrum was divided into channels 2-13, in any given geographic region only the odd or even channels are used. If the even channels are used in one region, the odd channels will be used in an adjacent region. Thus, the transmitters nearest a given region are guaranteed to be on different channels and the nearest transmitter using the same frequency will inherently be further away, generating less interference.

The control of transmitting devices in the manner described above works well when the transmitters are licensed through the regulatory agency and few in number. However, the proliferation of wireless and unlicensed consumer devices are large in number and require no licensing. It would be desirable for wireless devices and networks to take advantage of channelization and the resultant decrease in interference levels in unlicensed frequencies.

BRIEF SUMMARY OF THE INVENTION

The invention provides methods for autonomous detection and adaptation to an interfering signal on a frequency channel to assist a wireless device on a wireless network in choosing an appropriate frequency channel. According to the invention, a method determines an appropriate channel by first detecting whether there is an interfering signal on a frequency channel over the wireless network, then retrieving data from the interfering signal to retrieve protocol identification information. Prior to determining whether to transmit over the frequency channel, the method calls for determining whether the identified protocol of the interfering signal is a predetermined protocol. To determine the protocol identification information, a beacon or packet header transmitted by a generator of the interfering signal can be read by the wireless device, a host of the wireless network, a client device in the wireless network, or an access point.

If the identified protocol is a predetermined protocol, interference from the interfering signal can be subject to further criteria for determining whether to select an alternate frequency channel. If the predetermined protocol is a same protocol as a signal to be transmitted over the frequency channel, a higher level of interference can be tolerated. Also, the interfering signal can be compared to a threshold power level that is a function of the protocol used by the interfering signal. The threshold power level can be a higher power threshold if the protocol used by the interfering signal is a protocol sharing predetermined functionalities with the wireless device. So, if the protocol is the same, the power of the interfering signal can be greater. Conversely, the threshold power level is a lower power threshold if the protocol used by the interfering signal is not a protocol sharing predetermined functionalities with the wireless device. To determine a threshold power, the protocol of the interfering signal is identified in a database prior to determining a threshold power level with which the wireless device could transmit on the frequency channel. Thus, the threshold power level is a function of the identified protocol, such that, for example, the wireless device transmits on the frequency channel if the interfering signal is below the threshold power level. After a power level is found and is acceptable to allow signal transmission, the transmitting signal can be boosted to increase signal to noise levels or can be reduced to save power of the transmitting device.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
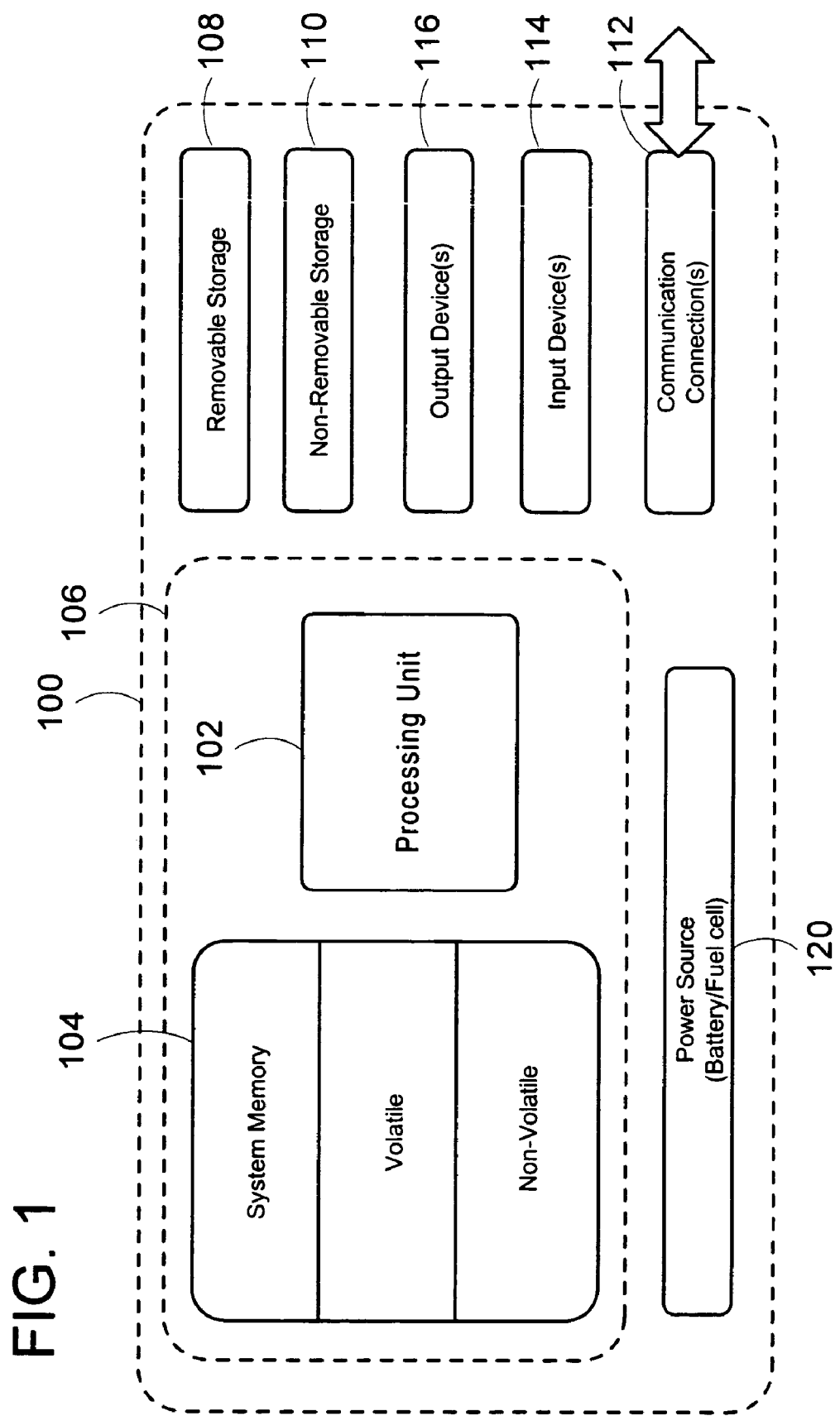
FIG. 1 is a block diagram generally illustrating an exemplary wireless computer device on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The invention may be implemented in a system employing various types of machines, including cell phones, hand-held devices, wireless surveillance devices, microprocessor-based programmable consumer electronics, and the like, using instructions, such as program modules, that are executed by a processor. Generally, program modules include routines, objects, components, data structures and the like that perform particular tasks or implement particular abstract data types. The term "program" includes one or more program modules.

FIG. 1 shows an exemplary computing device 100 for implementing one or more embodiments of the invention. In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. The basic configuration is illustrated in FIG. 1 by a dashed line 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer storage media includes volatile and nonvolatile, removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

Device 100 may also contain one or more communications connections 112 which allow the device to communicate with other devices. The communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media. Device 100 may also have one or more input devices 114 such as keyboard, mouse, pen, audio devices, touch-input device, etc. One or more output devices 116 such as a display, speakers, printer, etc. may also be included. All these devices are well known in the art and need not be discussed at greater length here.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

The invention address limitations in the current methods of avoiding interference in radio frequency spectrums, and, in particular, unlicensed radio frequency spectrums. One such method is referred to as dynamic frequency selection (DFS). Dynamic frequency selection is a technique whereby a transmitting device measures the interference on each channel before choosing a channel for transmission. The transmitting device selects the channel with the lowest level of interference under the assumption that this channel will provide the lowest level of interference and hence the highest CIR at the receiver.

One problem with the DFS technique is that not all interfering signals are equivalent. Often a second transmitting device which implements the same protocol will inherently avoid interfering due to media access control techniques that prevent multiple devices from transmitting at the same time or transmitting uncorrelated signals. Therefore, a need exists for a DFS system which differentiates between different types of interferers.

The present invention implements a DFS technique in which interferers which use the same transmission protocol as the transmitting device are not treated differently than those that transmit using a different protocol.

Figure 2:
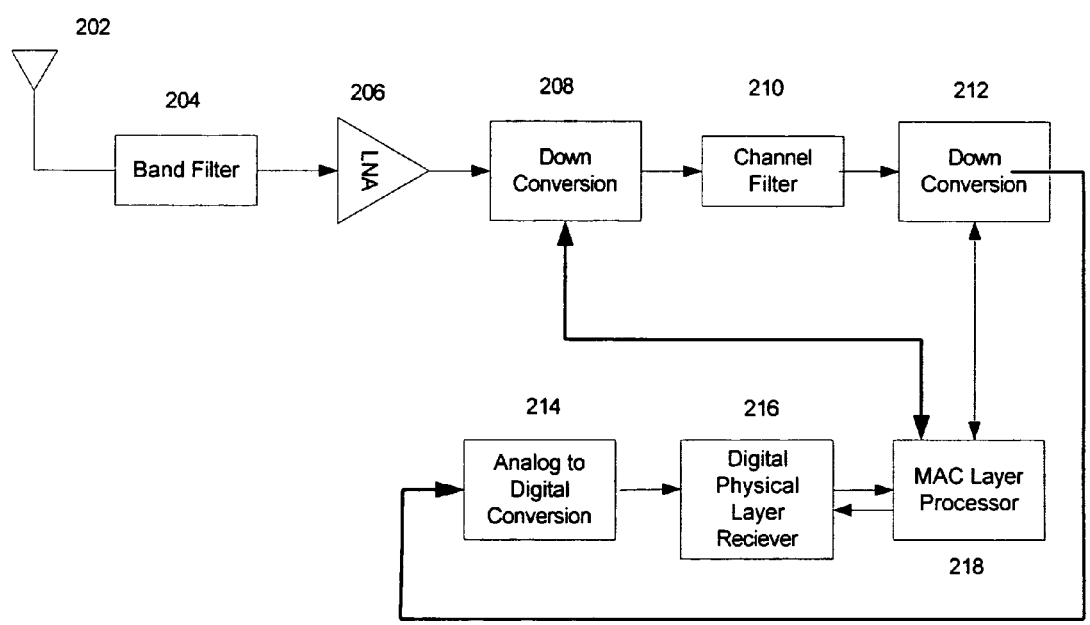
FIG. 2, labeled "prior art" is a flow diagram illustrating a known digital radio receiver.

A typical digital radio receiver is shown in FIG. 2. Many radio receiver architectures are known in the art and FIG. 2 is typical of one common architecture shown for illustrative purposes and is not meant to be limiting. The radio consists of antenna 202 coupled to band filter 204. Band filter 204 removes signals outside of the desired band of the radio spectrum in which the desired signals are known to exists.

Band filter 204 is coupled to low noise amplifier (LNA) 206. LNA 206 boosts the level of the received signal while being optimized to add little thermal noise to the received signal.

LNA 206 is coupled to down converter 208 which changes the center frequency of the received signal. Down converter 208 is additionally coupled to MAC processor 218. MAC processor 218 can configure down converter 208 to change the amount of frequency shift of the received signal. In addition, it is common for down converter 208 to pass an estimate of the total power in the band to MAC processor 218. The frequency shift realized in down converter 208 will be set to place the desired channel in the passband of channel filter 210.

Channel filter 210 removes the channel selected for reception while blocking all other channels in the band of operation. Channel filter 210 is coupled to down converter 212 which shifts the center frequency of the received signal to DC.

Down converter 212 is coupled to analog to digital converter 214 which converts the analog signal to a sampled digital signal. Down converter 212 is also coupled to MAC processor 218 and in one implementation provides an estimate of instantaneous power in the selected channel to MAC processor 218.

Analog to digital converter 214 is coupled to digital physical layer receiver 216. Digital physical layer receiver 216 converts the digital sequence from analog to digital converter 214 into a bit stream. Digital physical layer receiver 216 will perform functions such as timing recovery, symbol recovery, equalization, despreading, error detection and correction, and bit slicing. Digital physical layer receiver is often implemented as digital hardware, a programmable digital signal processor, or both. Digital physical layer receiver 216 is coupled to MAC layer processor 218. MAC layer processor 218 controls access to the radio channel, including controlling channel selection.

Figure 3:
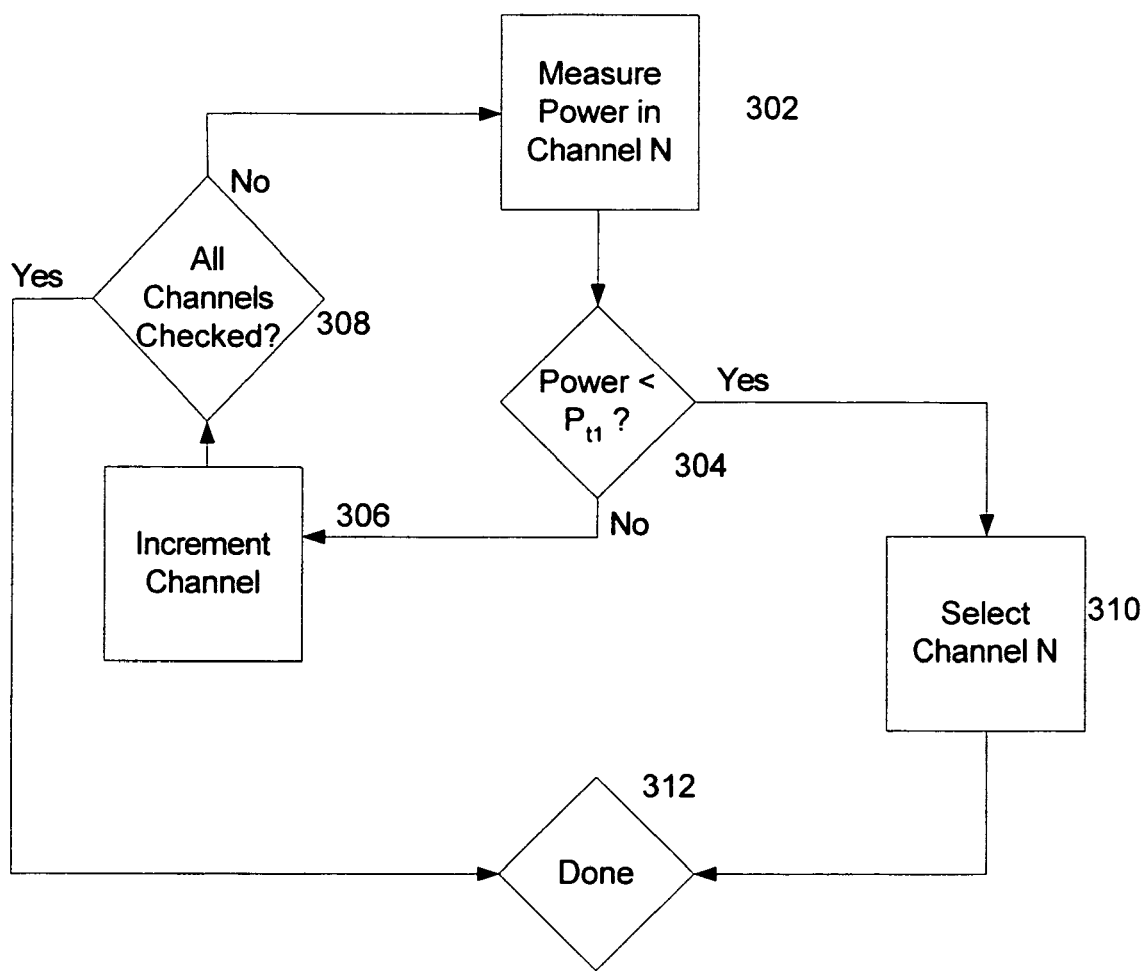
FIG. 3 illustrates a flow diagram of a system demonstrates a transmitter that can attempt to measure the interference levels caused by other transmitters in accordance with an embodiment of the present invention.

Referring now to FIG. 3, a flow diagram of a system demonstrates a transmitter that can attempt to measure the interference levels caused by other transmitters. The type of transmitter appropriate for performing the method shown in FIG. 3 can be a transmitter in a wireless LAN system, either a host or a client as will be appreciated with one of skill in the art with the benefit of this disclosure. For example, the devices and wireless systems can be IEEE 802.11 type devices and system, including 802.11a, 802.11b, 802.11g, and other 802.11 type devices, collectively referred to herein as 802.11x devices. Other devices could include BlueTooth type devices, for example. Each device or system can follow a predetermined method for performing channel selection and have a protocol that determines whether a host, client or access point or the like performs the channel selection. One method commonly used to measure interference is to determine the power level of the received signal, as shown in block 302. In many digital radio systems, interference will not be constant over time as transmitters tend to operate only a fraction of the time. Because transmitters do not operate consistently, the power levels should be measured over a period of time. Several algorithms can be used to determine the level of interference, as is known in the art. For example, power can be measured by sampling a given signal and determining an average power.

In block 304 the interference level is compared to a threshold power $P_{t1}$. If the interference power level is below this threshold, the channel is selected in block 310 and the wireless device begins transmission on this channel. If the interference level is above the threshold $P_{t1}$, then in block 304 the channel number is incremented in block 306.

Block 308 checks to determine if all channels have been measured. If none of the channels passes the test in block 304, then no channel is selected for transmission. In one embodiment, if the channels pass the test illustrated in block 304, only those channels designated as appropriate channels for communication are used. In other embodiments, if no channels are determined to pass the test illustrated in block 304, a lowest interference channel could be chosen. More particularly, the decision as to whether a lowest interference channel should apply could be determined by the requirements for the system. Thus, a system requiring a very low noise channel could determine that no channels are appropriate, like low cost point to point communication systems (e.g., walkie talkies).

Not all interferers are equally detrimental to radio reception. For example, often times two radios operating under the same protocol will not interfere with each other because the MAC layers of the two devices are designed to avoid transmitting simultaneously. For example, some wireless protocols can implement intelligent methods of determining how to share a channel by timing methods, carrier sensing methods, code division multiplexing methods and the like. Other methods may take advantage of physical layer similarities in same protocol transmission by using interference cancellation or other filtering methods that can mitigate interference, which are known in the art. Microwave ovens often transmit with a fixed duty cycle. This allows regular periods in which no interference is generated even though the peak interference levels can be quite high. Thus, if the type of interferer can be identified the thresholds can be adjusted to account for the type of interferer.

Figure 4:
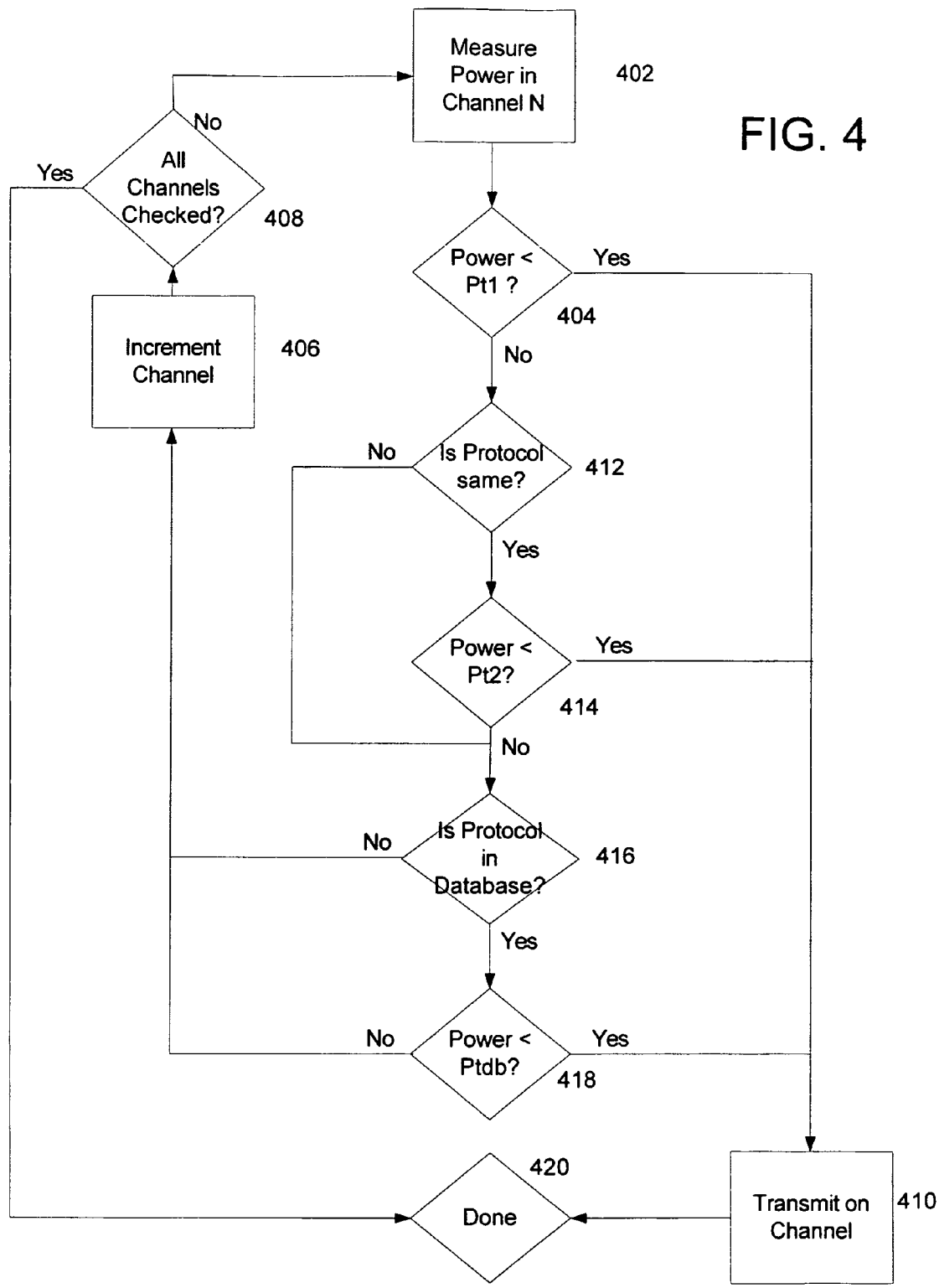
FIG. 4 illustrates a flow diagram a flow diagram that addresses interference detected by a wireless device by determining the type of system generating the interference and adjusting the power threshold for accepting a channel based on the type of system in accordance with an embodiment of the present invention.

Referring now to FIG. 4, a flow diagram illustrates an embodiment of the present invention that addresses interference by determining the type of system generating the interference and adjusting the power threshold for accepting a channel. The interference is measured in block 402. In block 404 the interference is compared to the threshold $P_{t1}$. If the interference power is below this threshold, the channel is selected in block 410. If the channel threshold is above $P_{t1}$ the protocol of the interferer is examined in block 412. The protocol can often be determined by examining beacon frames or physical layer headers present in many protocols.

If the protocol of the interferer is the same as the inquiring device is a protocol sharing predetermined functionalities with the inquiring device, then the power of the interferer is compared to a second, higher threshold $P_{t2}$ in block 414. The higher threshold allows for the fact that often devices are less sensitive to interference from devices which transmit using the same protocol. If the interference level is below $P_{t2}$ then the channel is selected in block 410.

If the protocol of the interferer is not the same as that used by the inquiring device, then attempts are made to determine the protocol of the interfering device in block 416. The determination is made by comparing the interfering signal to those stored in a database. Once the protocol of the interferer is determined, a new threshold, $P_{tdb}$, can be determined based on the sensitivity of the protocol in use to the protocol of the interferer in block 418. The interference level is then compared to $P_{tdb}$ and if the interference level is lower, then that channel is selected in block 410.

If either block 416 or 418 is not true, then the channel number is incremented in block 406. Block 408 determines if all channels have been checked. If not, then the flow returns to block 402 and the process begins again on the next channel. If all channels have been checked and no channel has been selected then the channel selection process exits in block 420. Once a channel is selected in block 410, the channel process also exits through block 420. However, after a power level is found and is acceptable to allow signal transmission, the transmitting signal can be boosted to increase signal to noise levels or can be reduced to save power of the transmitting device.

The channel selection algorithm is performed when a device first powers up but also must be performed periodically because interference levels change as devices come into and out of service.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of determining an appropriate channel for a wireless device in a wireless network, the method comprising:
   detecting a potentially interfering signal on a frequency channel over the wireless network;
   retrieving data from the interfering signal to retrieve protocol identification information; and
   prior to determining whether to transmit over the frequency channel, determining whether the identified protocol of the interfering signal is a predetermined protocol, wherein the potentially interfering signal is compared to a threshold power level, the threshold power level being a function of the protocol used by the potentially interfering signal.

2. The method of claim 1 wherein the threshold power level is a higher power threshold if the protocol used by the potentially interfering signal is a protocol sharing predetermined functionalities with the wireless device.

3. The method of claim 2 wherein the wireless device transmits over the channel if the power level of the potentially interfering signal is below the threshold power level, wherein the transmitting of the wireless device is at a boosted power level to increase signal to noise levels of the wireless network.

4. The method of claim 2 wherein the wireless device transmits over the channel if the power level of the potentially interfering signal is below the threshold power level, wherein the transmitting of the wireless device is at a lowered power level to decrease power used by the wireless device.

5. The method of claim 1 wherein the threshold power level is a lower power threshold if the protocol used by the interfering signal is not a protocol sharing predetermined functionalities with the wireless device.

6. The method of claim 1 wherein the protocol of the potentially interfering signal is identified in a database prior to determining a threshold power level with which the wireless device could transmit on the frequency channel and wherein the threshold power level is a function of the identified protocol.

7. The method of claim 6 wherein the wireless device transmits on the frequency channel if the potentially interfering signal is below the threshold power level.

8. A tangible computer readable medium encoded with computer-readable instructions for performing acts for determining an appropriate channel for a wireless device in a wireless network, the acts comprising:
   detecting a potentially interfering signal on a frequency channel over the wireless network;
   retrieving data from the potentially interfering signal to retrieve protocol identification information; and
   prior to determining whether to transmit over the frequency channel, determining whether the identified protocol of the potentially interfering signal is a predetermined protocol, wherein the potentially interfering signal is compared to a threshold power level, the threshold power level being a function of the protocol used by the potentially interfering signal.

9. The computer readable medium of claim 8 wherein the threshold power level is a higher power threshold if the protocol used by the interfering signal is a protocol sharing predetermined functionalities with the wireless device.

10. The computer readable medium of claim 8 wherein the threshold power level is a lower power threshold if the protocol used by the potentially interfering signal is not a protocol sharing predetermined functionalities with the wireless device.

11. The computer readable medium of claim 8 wherein the protocol of the potentially interfering signal is identified in a database prior to determining a threshold power level with which the wireless device could transmit on the frequency channel and wherein the threshold power level is a function of the identified protocol.

12. The computer readable medium of claim 11 wherein the wireless device transmits on the frequency channel if the interfering signal is below the threshold power level.

13. A computer system comprising:
   a processor; and
   a memory coupled to the processor, the memory including one or more program modules configured to determine an appropriate channel for communication over a wireless network by detecting a potentially interfering signal on a frequency channel, the program modules including at least:

a first program module configured to retrieve data from the interfering signal to identify protocol identification information; and a second program module configured to determine whether the identified protocol of the potentially interfering signal is a predetermined protocol, the second program module operable prior to a determination of whether to transmit over the frequency channel, wherein the potentially interfering signal is compared to a threshold power level, the threshold power level being a function of the protocol used by the potentially interfering signal.

14. The computer system of claim 13 wherein the threshold power level is a higher power threshold if the protocol used by the potentially interfering signal is a protocol sharing predetermined functionalities with the computer system or a wireless device coupled to the computer system.

15. The computer system of claim 14, further comprising:
a third program module configured to transmit over the channel if the power level of the potentially interfering signal is below the threshold power level, wherein the transmission is at a boosted power level to increase signal to noise levels of the wireless network.

16. The computer system of claim 14 further comprising:
a third program module configured to transmit over the channel if the power level of the potentially interfering signal is below the threshold power level, wherein the transmission is at a lowered power level to decrease power used by the computer system.

17. The computer system of claim 13 wherein the threshold power level is a lower power threshold if the protocol used by the interfering signal is not a protocol sharing predetermined functionalities with the computer system or a wireless device coupled to the computer system.

18. The computer system of claim 13 further comprising a database configured to hold a plurality of protocols, wherein the protocol of the potentially interfering signal is checked against the plurality of protocols to determine a threshold power level with which to transmit on the frequency channel and wherein the threshold power level is a function of the identified protocol.

* * * * *